(12) United States Patent
Bass

(10) Patent No.: US 6,943,036 B2
(45) Date of Patent: Sep. 13, 2005

(54) ERROR DETECTION IN CHEMICAL ARRAY FABRICATION

(75) Inventor: Jay K. Bass, Mountain View, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 09/846,474

(22) Filed: Apr. 30, 2001

(65) Prior Publication Data

US 2002/0160370 A1 Oct. 31, 2002

(51) Int. Cl.[7] .................... G01N 1/10; G01N 21/00; G01N 1/00; G01N 33/48; B01L 3/02

(52) U.S. Cl. ................ 436/180; 436/174; 436/164; 422/100; 422/68.1; 422/82.05; 435/6; 435/7.1; 435/174

(58) Field of Search .................. 436/180, 174, 436/164, 166; 422/100, 68.1, 82.05; 435/6, 7.1, 174

(56) References Cited

U.S. PATENT DOCUMENTS

| | | | |
|---|---|---|---|
| 4,675,696 A | | 6/1987 | Suzuki |
| 5,059,393 A | * | 10/1991 | Quenin et al. ............... 422/64 |
| 5,425,918 A | * | 6/1995 | Healey et al. ............... 422/64 |
| 5,449,754 A | | 9/1995 | Nishioka |
| 5,508,200 A | | 4/1996 | Tiffany et al. |
| 5,601,980 A | | 2/1997 | Gordon et al. |
| 5,658,802 A | | 8/1997 | Hayes et al. |
| 5,715,327 A | * | 2/1998 | Wilhelm et al. ............ 382/128 |
| 5,721,435 A | | 2/1998 | Troll |
| 5,807,522 A | | 9/1998 | Brown et al. |
| 5,843,655 A | | 12/1998 | McGall |
| 5,948,359 A | * | 9/1999 | Kalra et al. ................... 422/65 |
| 5,981,733 A | | 11/1999 | Gamble et al. |
| 5,984,470 A | | 11/1999 | Sakino et al. |
| 6,001,309 A | | 12/1999 | Gamble et al. |
| 6,024,925 A | * | 2/2000 | Little et al. ................. 422/100 |
| 6,026,174 A | * | 2/2000 | Palcic et al. ................ 382/133 |

(Continued)

FOREIGN PATENT DOCUMENTS

| | | |
|---|---|---|
| EP | 1 179 364 | 2/2002 |
| EP | 1 179 368 | 2/2002 |

(Continued)

OTHER PUBLICATIONS

U.S. Appl. No. 09/359,527, filed Jul. 22, 1999 titled "Biopolymer Arrays and Their Fabrication". (Peter G. Webb, Michael P. Caren and Kyle J. Schleifer).

(Continued)

*Primary Examiner*—Jill Warden
*Assistant Examiner*—Brian R. Gordon

(57) ABSTRACT

A method, apparatus, and computer program product, for forming an addressable array of chemical moieties on a substrate. The method may include, for each of multiple locations on the substrate, depositing a reagent drop set during a cycle so as to attach a corresponding moiety for that location. This may be repeated as required, until the addressable array is formed. Test location are also formed by depositing drops from dispensers in a manner which can facilitate detection of dispenser errors.

39 Claims, 5 Drawing Sheets

U.S. PATENT DOCUMENTS

| | | | |
|---|---|---|---|
| 6,063,339 A | | 5/2000 | Tisone et al. |
| 6,110,426 A | * | 8/2000 | Shalon et al. ............... 422/68.1 |
| 6,122,396 A | * | 9/2000 | King et al. .................. 382/133 |
| 6,140,044 A | | 10/2000 | Besemer et al. |
| 6,215,892 B1 | * | 4/2001 | Douglass et al. ........... 382/128 |
| 6,232,072 B1 | | 5/2001 | Fisher |
| 6,235,534 B1 | * | 5/2001 | Brookes et al. ............. 436/164 |
| 6,238,862 B1 | | 5/2001 | McGall et al. |
| 6,269,846 B1 | * | 8/2001 | Overbeck et al. ............... 141/1 |
| 6,275,777 B1 | * | 8/2001 | Shimizu ...................... 702/30 |
| 6,284,465 B1 | | 9/2001 | Wolber |
| 6,327,377 B1 | * | 12/2001 | Rutenberg et al. .......... 382/133 |
| 6,330,349 B1 | * | 12/2001 | Hays et al. ................. 382/128 |
| 6,346,290 B1 | * | 2/2002 | Schultz et al. .................. 427/8 |
| 6,349,144 B1 | * | 2/2002 | Shams ........................ 382/129 |
| 6,351,573 B1 | * | 2/2002 | Schneider ................... 382/294 |
| 6,420,180 B1 | * | 7/2002 | Bass ........................... 436/43 |
| 6,541,261 B1 | * | 4/2003 | Bogen et al. ................. 436/46 |
| 6,587,579 B1 | * | 7/2003 | Bass ........................... 382/141 |
| 6,649,348 B2 | * | 11/2003 | Bass et al. ..................... 435/6 |
| 6,740,530 B1 | * | 5/2004 | Bruce et al. ................ 436/180 |
| 6,756,014 B2 | * | 6/2004 | Himmelhaus et al. ........ 422/61 |
| 6,794,197 B1 | * | 9/2004 | Indermuhle et al. ......... 436/174 |
| 6,808,934 B2 | * | 10/2004 | Mutz et al. ................. 436/180 |
| 6,849,461 B2 | * | 2/2005 | Eigen et al. ................. 436/180 |
| 2002/0001544 A1 | * | 1/2002 | Hess et al. .................. 422/100 |
| 2002/0106812 A1 | * | 8/2002 | Fisher ........................ 436/180 |
| 2002/0146841 A1 | * | 10/2002 | Dahm et al. ................. 436/180 |
| 2003/0087444 A1 | * | 5/2003 | Chiou et al. .................. 436/47 |
| 2003/0124733 A1 | * | 7/2003 | Bushway et al. ........... 436/174 |
| 2003/0134429 A1 | * | 7/2003 | Stoschek ..................... 436/183 |
| 2004/0219688 A1 | * | 11/2004 | Churchill et al. ........... 436/180 |

FOREIGN PATENT DOCUMENTS

| | | |
|---|---|---|
| EP | 1 208 912 | 5/2002 |
| WO | WO 93/17325 | 9/1993 |
| WO | WO 95/25116 | 9/1995 |
| WO | WO 98/41531 | 9/1998 |
| WO | WO 99/05308 | 2/1999 |
| WO | WO 00/34523 | 6/2000 |
| WO | WO 00/48735 | 8/2000 |
| WO | WO 00/60425 | 10/2000 |

OTHER PUBLICATIONS

"BioChip Arrayer: Automated DNA Microarray Fabrication", http://www.packardinst.com/prod_serv/blochiparrayer.htm, Packard Instrument Company, 1999, 3 pp.

"Press Rel as : New Options Optimize Arraying Technolgy", http://www.packardinst.com/pr/pr899–2.htm, Packard Instrument Company, Aug. 1, 1999, 2 pp.

Budach, Wolfgang et al., "Planar Waveguides as High–Performance Sensing Platforms for Fluorescence–Based Multiplexed Oligonucleotide Hybridization Assays", Anal, Chem., vol. 71, No. 16, Aug. 15, 1999, pp. 3347–3355.

Marshall, A. and Hodgson, J., "DNA Chips: An Array of Possibilities", Nature Biotechnology, vol. 16, Jan. 1998, pp. 27–31.

EPO Communication dated May 26, 2003, enclosing European Search Report for EP Application No. 02 25 3036 (priority claimed from U.S. Appl. No. 09/846,474) dated May 15, 2003, and Annex to the European Search Report.

* cited by examiner

ERROR DETECTION IN CHEMICAL ARRAY FABRICATION

FIELD OF THE INVENTION

This invention relates to arrays, particularly polynucleotide arrays such as DNA arrays, which are useful in diagnostic, screening, gene expression analysis, and other applications.

BACKGROUND OF THE INVENTION

In the following discussion and throughout the present application, no cited reference is admitted to be prior art to the present application.

Polynucleotide arrays (such as DNA or RNA arrays), are known and are used, for example, as diagnostic or screening tools. Such arrays include regions of usually different sequence polynucleotides arranged in a predetermined configuration on a substrate. These regions (sometimes referenced as "features") are positioned at respective locations ("addresses") on the substrate. The arrays, when exposed to a sample, will exhibit an observed binding pattern. This binding pattern can be detected upon interrogating the array. For example all polynucleotide targets (for example, DNA) in the sample can be labeled with a suitable label (such as a fluorescent compound), and the fluorescence pattern on the array accurately observed following exposure to the sample. Assuming that the different sequence polynucleotides were correctly deposited in accordance with the predetermined configuration, then the observed binding pattern will be indicative of the presence and/or concentration of one or more polynucleotide components of the sample.

Biopolymer arrays can be fabricated by depositing previously obtained biopolymers (such as from synthesis or natural sources) onto a substrate, or by in situ synthesis methods. Methods of depositing obtained biopolymers include loading then touching a pin or capillary to a surface, such as described in U.S. Pat. No. 5,807,522 or deposition by firing from a pulse jet such as an inkjet head, such as described in U.S. Pat. No. 6,180,351, PCT publications WO 95/25116 and WO 98/41531, and elsewhere. Such a deposition method can be regarded as forming each feature by one cycle of attachment (that is, there is only one cycle at each feature during which the previously obtained biopolymer is attached to the substrate). For in situ fabrication methods, multiple different reagent droplets are deposited by pulse jet or other means at a given target location in order to form the final feature (hence a probe of the feature is synthesized on the array substrate). The in situ fabrication methods include those described in U.S. Pat. No. 5,449,754 for synthesizing peptide arrays, and in U.S. Pat. No. 6,180,351 and WO 98/41531 and the references cited therein for polynucleotides, and may also use pulse jets for depositing reagents. The in situ method for fabricating a polynucleotide array typically follows, at each of the multiple different addresses at which features are to be formed, the same conventional iterative sequence used in forming polynucleotides from nucleoside reagents on a support by means of known chemistry. This iterative sequence can be considered as multiple ones of the following attachment cycle at each feature to be formed: (a) coupling an activated selected nucleoside (a monomeric unit) through a phosphite linkage to a functionalized support in the first iteration, or a nucleoside bound to the substrate (i.e. the nucleoside-modified substrate) in subsequent iterations; (b) optionally, blocking unreacted hydroxyl groups on the substrate bound nucleoside (sometimes referenced as "capping"); (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The coupling can be performed by depositing drops of an activator and phosphoramidite at the specific desired feature locations for the array. Capping, oxidation and deprotection can be accomplished by treating the entire substrate ("flooding") with a layer of the appropriate reagent. The functionalized support (in the first cycle) or deprotected coupled nucleoside (in subsequent cycles) provides a substrate bound moiety with a linking group for forming the phosphite linkage with a next nucleoside to be coupled in step (a). Final deprotection of nucleoside bases can be accomplished using alkaline conditions such as ammonium hydroxide, in another flooding procedure in a known manner. Conventionally, a single pulse jet or other dispenser is assigned to deposit a single monomeric unit.

The foregoing chemistry of the synthesis of polynucleotides is described in detail, for example, in Caruthers, Science 230: 281–285, 1985; Itakura et al., Ann. Rev. Biochem. 53: 323–356; Hunkapillar et al., Nature 310: 105–110, 1984; and in "Synthesis of Oligonucleotide Derivatives in Design and Targeted Reaction of Oligonucleotide Derivatives", CRC Press, Boca Raton, Fla., pages 100 et seq., U.S. Pat. No. 4,458,066, U.S. Pat. No. 4,500,707, U.S. Pat. No. 5,153,319, U.S. Pat. No. 5,869,643, EP 0294196, and elsewhere The phosphoramidite and phosphite triester approaches are most broadly used, but other approaches include the phosphodiester approach, the phosphotriester approach and the H-phosphonate approach. The substrates are typically functionalized to bond to the first deposited monomer. Suitable techniques for functionalizing substrates with such linking moieties are described, for example, in Southern, E. M., Maskos, U. and Elder, J. K., Genomics, 13, 1007–1017, 1992.

In the case of array fabrication, different monomers and activator may be deposited at different addresses on the substrate during any one cycle so that the different features of the completed array will have different desired biopolymer sequences. One or more intermediate further steps may be required in each cycle, such as the conventional oxidation, capping and washing steps in the case of in situ fabrication of polynucleotide arrays (again, these steps may be performed in flooding procedure).

In array fabrication, the quantities of polynucleotide available are usually very small and expensive. Additionally, sample quantities available for testing are usually also very small and it is therefore desirable to simultaneously test the same sample against a large number of different probes on an array. These conditions require use of arrays with large numbers of very small, closely spaced features. It is important in such arrays that features actually be present, that they are put down as accurately as possible in the desired target pattern, are of the correct size, and that the DNA is uniformly coated within the feature. If any of these conditions are not met within a reasonable tolerance, the results obtained from a given array may be unreliable and misleading. This of course can have serious consequences to diagnostic, screening, gene expression analysis or other purposes for which the array is being used.

However, in any system used to fabricate arrays with the required small features, there is inevitably some degree of error, either fixed (and hence repeated) and/or random. In the case of both the deposition of previously obtained biopolymers, but particularly in the in situ fabrication method, drop deposition errors may occur from cycle to cycle and may be different from different cycles or may be the same. For example, one or more drop dispensers may exhibit an error (that is, a malfunction) during particular cycles or may have a same malfunction over multiple cycles. Such malfunctions include errors in firing (that is, "misfiring" which includes not dispensing a drop at all or dispensing an incorrect drop volume) as well as trajectory errors (that is, the dispenser fires a drop on an unexpected error due, for example, to an error in nozzle construction).

It would be desirable then to provide a means by which drop dispenser errors during any array fabrication method, can be identified.

SUMMARY OF THE INVENTION

The present invention realizes that drop dispenser errors may be evaluated by detecting (such as by imaging) one or more drops deposited by the dispenser onto the substrate during array fabrication. However, the present invention further realizes that multiple dispensers may deposit drops at a same feature over one or more same cycles. In this situation, while a first drop deposited by a first dispenser on a substrate location may be detected, it is difficult to detect a second and subsequent drops deposited at the same location by different dispensers. This is so in the case since where different dispensers dispense drops to the same location during a same cycle, the second and subsequent drops mix with the first drop previously deposited on the substrate and it may be difficult to then evaluate whether the second or subsequent drops were actually deposited or of correct volume and location (that is, it may be difficult to evaluate whether the second and subsequent drop dispensers are in error). Other factors may also make such an evaluation difficult. Even in the case where only one drop is dispensed by a dispenser during each of multiple cycles, with different drops being dispensed by different dispensers at the same location over multiple cycles, it may become difficult to detect later drops. For example, changes in surface properties of the substrate may occur as a result of one or more reagents (such as an activated phosphoramidite) being applied to the same location over the many cycles. In this case, the feature location on the substrate becomes more hydrophilic than the hydrophobic starting substrate surface. In such a situation even though a dispenser may dispense a drop slightly off from a target location (for example 20 μm off the center of a feature) the droplet may still migrate to the center because it prefers the hydrophilic region, and the resulting array is fine. Thus, it may be useful to evaluate the results from the detecting based on what cycle they are from in order to estimate their impact. A same deposition error (for example, the 20 μm error mentioned) at earlier cycles in the start of a feature synthesis will likely be of more concern than at later cycles.

The present invention then, provides in a method of forming an addressable array of chemical moieties on a substrate. The method includes for each of multiple locations (sometimes referenced as "feature locations") on the substrate, depositing a reagent drop set during a cycle so as to attach a corresponding moiety for that location. The foregoing is repeated as required, until the addressable array is formed. In any event, for each of multiple locations, a multi-dispenser drop group is deposited over one or more cycles for a corresponding feature location which group includes drops which are deposited from different dispensers. By "over" in this context is meant in one cycle, or as a result of multiple cycles (for example, two dispenser one dispenses one drop and dispenser two dispenses another drop at the same location) The method additionally includes depositing and detecting drops at respective separate locations (sometimes referenced as "test locations") on the substrate from different dispensers which deposit a multi-dispenser drop group.

The present invention also provides a method of forming multiple addressable arrays of chemical moieties on a substrate, in which for each array, for each of multiple feature locations on the substrate a reagent drop set is deposited during a cycle so as to attach a corresponding moiety for that location. This step is repeated if required until the addressable array is formed. Multiple dispensers are used to dispense drops to form the array. The method additionally includes depositing and detecting drops from the different dispensers at respective separate locations on the substrate, wherein the drops are deposited at a separate test pattern area between arrays. In this case, the number of test locations of the test pattern area during any one cycle may be less than one quarter (or even less than one-tenth or one-twentieth) the number of locations in the smallest of the arrays which the test pattern area is between. Also, the number of locations of the test pattern area during any one cycle may be such as to not be greater than ten times (or not greater than five or two times, and may even be the same as) the number of the dispensers used to form an array during any one cycle. The test pattern area may be the same area through which the substrate is later cut or otherwise separated to provide multiple portions of the substrate each with one or more fabricated arrays thereon.

The method may be used for forming an addressable array of polymers on the substrate. In this case, the reagent drop set deposited during a cycle attaches a monomeric unit of the corresponding polymer for that feature location. However, a method of the present invention could also be used.

A method of the present invention may (by "may" throughout this application is meant "optionally") include the possibility of not independently detecting drops of a drop group at a corresponding feature location at which such group is deposited, for one or more or all such feature locations receiving a drop group. Alternatively, or additionally, a method of the present invention may include the referenced separate test locations in a test pattern area which is separate from (that is, distinguishable from) the array.

A method of the present invention may use a multi-dispenser drop group which has a drop including an attachment moiety which becomes attached at a feature location at which the group is deposited but which does not become attached at test location. For example, the attachment moiety may be one which will become attached at the feature location upon activation by an activator. Another drop of the group may include the activator moiety. In the foregoing example, the attachment moiety and activator are deposited at separate test locations. Results from the detecting (such as an image) may be evaluated for a dispenser error. When an error is detected, the array may be discarded or an attempt made to correct such error (such as by depositing further drops to correct the error), or the results used for other purposes. Also, drops of a multi-dispenser drop group may, but need not, contact one another. For example, in the attachment moiety and activator combination already mentioned, drops of each will typically be deposited in a same cycle and so will contact one another. However, particularly where the multi-dispenser drop group is over multiple cycles, a drop of the group deposited in one cycle may already have been removed from the corresponding feature location before a drop of the group in another cycle contacts that same feature location.

The present invention further provides an apparatus which an execute a method of the present invention. Such an apparatus may include a deposition system having multiple dispensers each of which can dispense a reagent drop, as well as a transport system to move at least one of the deposition system or the substrate. A drop detector may further be present, as well as a process which controls the deposition system and the transport system such that a method of the present application may be performed. The present invention also provides a computer program product which can execute any one or more methods of the present invention. Optionally, the present invention may further provide for exposing the array to a sample, and reading the array following the exposure and optionally processing results of the interrogation. The result of an array reading (whether processed or not) may be forwarded for receipt at a remote location.

The various aspects of the present invention can provide any one or more of the following and/or other useful benefits. For example, a dispenser error which could result in a feature error during an in situ or any array fabrication method, can be detected. This allows an opportunity to identify and discard possibly defect arrays or an opportunity to attempt to correct the defect.

BRIEF DESCRIPTION OF THE DRAWINGS

To facilitate understanding, identical reference numerals have been used, where practical, to designate identical elements that are common to the figures.

DETAILED DESCRIPTION OF EMBODIMENTS OF THE INVENTION

Figure 1:
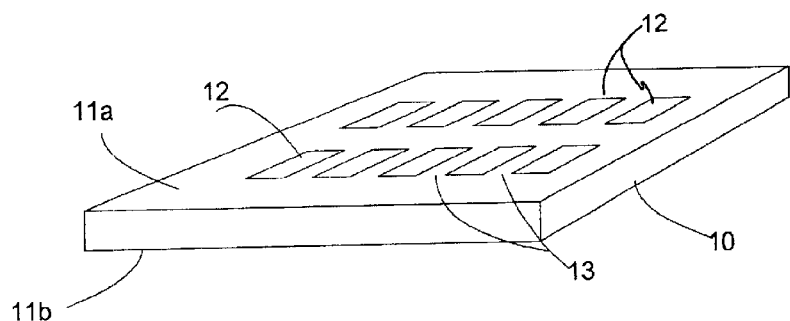
FIG. 1 illustrates a substrate carrying multiple arrays, such as may be fabricated by methods of the present invention.

In the present application, unless a contrary intention appears, the following terms refer to the indicated characteristics. A "biopolymer" is a polymer of one or more types of repeating units. Biopolymers are typically found in biological systems and particularly include polysaccharides (such as carbohydrates), and peptides (which term is used to include polypeptides and proteins) and polynucleotides as well as their analogs such as those compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions. Polynucleotides include single or multiple stranded configurations, where one or more of the strands may or may not be completely aligned with another. A "nucleotide" refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. For example, a "biopolymer" includes DNA (including cDNA), RNA, oligonucleotides, and PNA and other polynucleotides as described in U.S. Pat. No. 5,948,902 and references cited therein (all of which are incorporated herein by reference), regardless of the source. An "oligonucleotide" generally refers to a nucleotide multimer of about 10 to 100 nucleotides in length, while a "polynucleotide" includes a nucleotide multimer having any number of nucleotides. A "biomonomer" references a single unit, which can be linked with the same or other biomonomers to form a biopolymer (for example, a single amino acid or nucleotide with two linking groups one or both of which may have removable protecting groups). A biomonomer fluid or biopolymer fluid reference a liquid containing either a biomonomer or biopolymer, respectively (typically in solution).

A "drop" is a small amount of liquid traveling in a space, and while often approximately spherical if no external forces are acting upon it, may have other shapes depending upon those other forces. In the present case, a drop which has contacted a substrate is often referred to as a deposited drop, although sometimes it will be simply referenced as a drop when it is understood that it was previously deposited. Detecting a drop "at" a location, includes the drop being detected while it is traveling between a dispenser and that location, or after it has contacted that location (and hence may no longer retain its original shape) such as capturing an image of a drop on the substrate after it has assumed an approximately circular shape of a deposited drop. A "pulse jet" is a device which can dispense drops in the formation of an array. Pulse jets operate by delivering a pulse of pressure (such as by a piezoelectric or thermoelectric element) to liquid adjacent an outlet or orifice such that a drop will be dispensed therefrom.

A "set" of anything (such as a set of drops), may contain only one, or only two, or three, or any number of multiple drops (although where "drops" are referenced in relation to a set implies the set in that case includes multiple drops). A "group" of drops has multiple drops. An "array", unless a contrary intention appears, includes any one, two or three dimensional arrangement of addressable regions bearing a particular chemical moiety or moieties (for example, biopolymers such as polynucleotide sequences) associated with that region. An array is "addressable" in that it has multiple regions of different moieties (for example, different polynucleotide sequences) such that a region (a "feature" or "spot" of the array) at a particular predetermined location (an "address") on the array will detect a particular target or class of targets (although a feature may incidentally detect non-targets of that feature). Array features are typically, but need not be, separated by intervening spaces. In the case of an array, the "target" will be referenced as a moiety in a mobile phase (typically fluid), to be detected by probes ("target probes") which are bound to the substrate at the various regions. However, either of the "target" or "target probes" may be the one which is to be evaluated by the other (thus, either one could be an unknown mixture of polynucleotides to be evaluated by binding with the other). An "array layout" refers collectively to one or more physical, chemical or biological characteristics of the features, such as feature positioning, one or more feature dimensions, or some indication of an identity or function (for example, chemical or biological) of a moiety at a given location. "Hybridizing" and "binding", with respect to polynucleotides, are used interchangeably. During a "cycle" for forming a given feature, typically at least 50% (and more typically at least 70%, 80% or more preferably at least 90% or 95%) of moieties bound to a substrate surface available to link with a deposited monomeric unit or previously obtained complete moiety for forming the desired feature, actually link to such deposited monomeric unit or complete moiety.

When one item is indicated as being "remote" from another, this is referenced that the two items are at least in different buildings, and may be at least one mile, ten miles, or at least one hundred miles apart. "Communicating" information references transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data. An array "package" may be the array plus only a substrate on which the array is deposited, although the package may include other features (such as a housing with a chamber). A "chamber" references an enclosed volume (although a chamber may be accessible through one or more ports). It will also be appreciated that throughout the present application, that words such as "top", "upper", and "lower" are used in a relative sense only. "Fluid" is used herein to reference a liquid. Reference to a singular item, includes the possibility that there are plural of the same items present. The steps of any method may be performed in the recited order, or in any other order that is logically possible. For example, the depositing and detecting drops at respective separate locations on the substrate from different dispensers which deposit a multi-dispenser drop group, may be performed before, during, or after array fabrication. All patents and other references cited in this application, are incorporated into this application by reference except insofar as where any definitions in those references conflict with those of the present application (in which case the definitions of the present application are to prevail).

Figure 2:
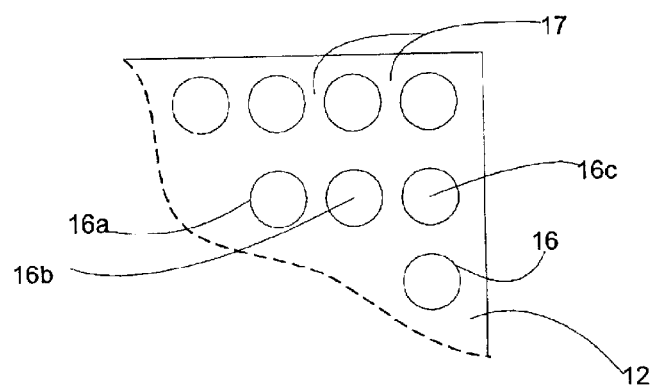
FIG. 2 is an enlarged view of a portion of FIG. 1 showing multiple ideal spots or features.
Figure 3:
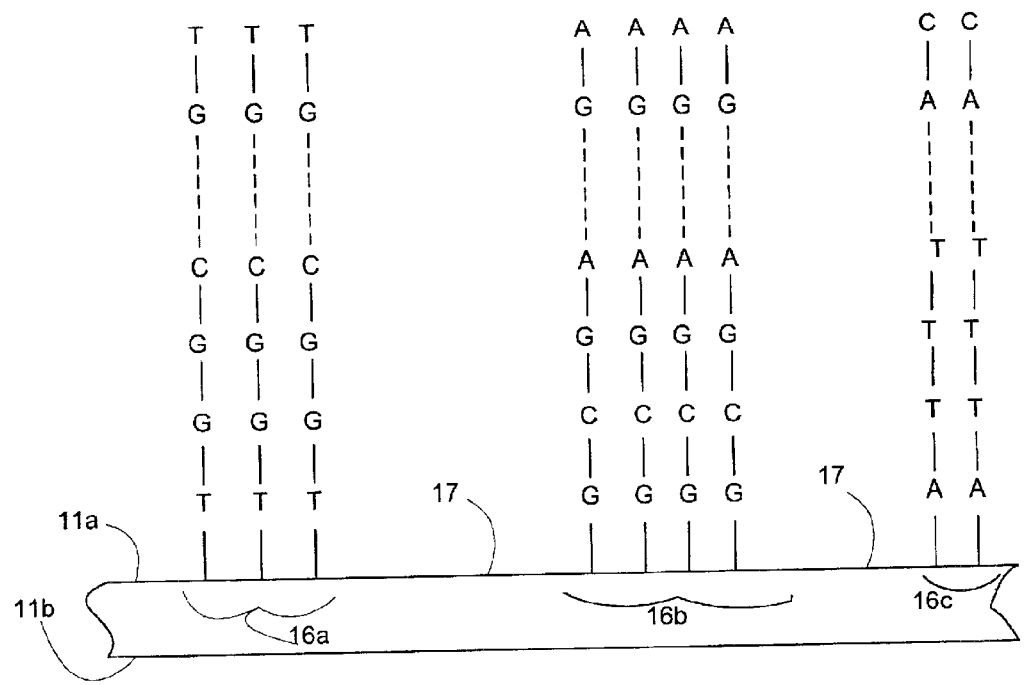
FIG. 3 is an enlarged illustration of a portion of the substrate in FIG. 2.
Figure 5:
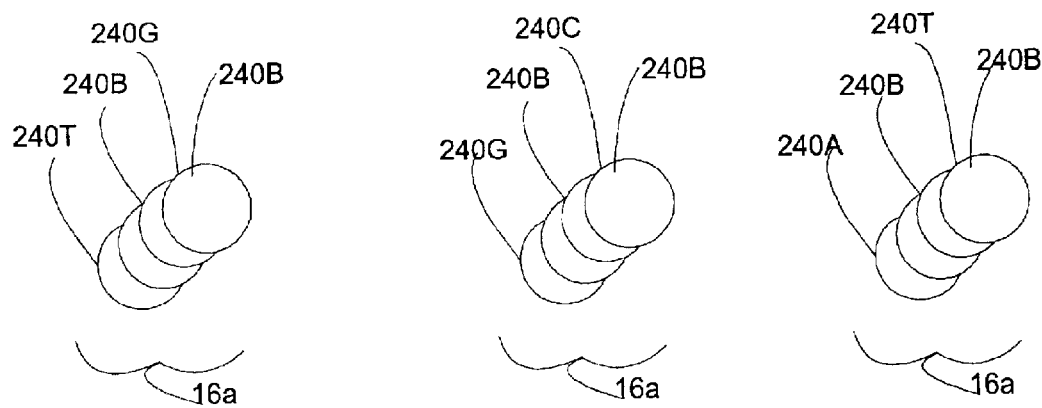
FIG. 5 schematically illustrates a pattern of deposited drops over two cycles for fabrication of the first two nucleotides of the array portion illustrated in FIG. 3.

Referring first to FIGS. 1–3, typically methods and apparatus of the present invention generate or use a contiguous planar substrate 10 carrying one or more arrays 12 disposed across a front surface 11a of substrate 10 and separated by inter-array areas 13. A back side 11b of substrate 10 does not carry any arrays 12. The arrays on substrate 10 can be designed for testing against any type of sample, whether a trial sample, reference sample, a combination of them, or a known mixture of polynucleotides (in which latter case the arrays may be composed of features carrying unknown sequences to be evaluated). While ten arrays 12 are shown in FIG. 5 and the different embodiments described below may use substrates with particular numbers of arrays, it will be understood that substrate 10 and the embodiments to be used with it, may use any number of desired arrays 12. Similarly, substrate 10 may be of any shape, and any apparatus used with it adapted accordingly. Depending upon intended use, any or all of arrays 12 may be the same or different from one another and each will contain multiple spots or features 16 of biopolymers in the form of polynucleotides. A typical array may contain from more than ten, more than one hundred, more than one thousand or ten thousand features, or even more than from one hundred thousand features. All of the features 16 may be different, or some or all could be the same. In the case where arrays 12 are formed by the conventional in situ or deposition of previously obtained moieties, as described above, by depositing for each feature a droplet of reagent in each cycle such as by using a pulse jet such as an inkjet type head, inter-feature areas 17 will typically (but not essentially) be present which do not carry any polynucleotide. It will be appreciated though, that the interfeature areas 17 could be of various sizes and configurations. It will also be appreciated that there need not be any space separating arrays 12 from one another. Each feature carries a predetermined polynucleotide (which includes the possibility of mixtures of polynucleotides). As per usual, A, C, G, T represent the usual nucleotides. It will be understood that there is usually a linker molecule (not shown) of any known types between the front surface 11a and the first nucleotide.

FIGS. 2 and 3 illustrate ideal features where the actual features formed are the same as the target (or "aim") features, with each feature 16 being uniform in shape, size and composition, and the features being regularly spaced. Such an array when fabricated by drop deposition methods, would require all reagent droplets for each feature to be uniform in shape and accurately deposited at the target feature location. In practice, such an ideal result is difficult to obtain due to fixed and random errors during fabrication.

For the purposes of the discussions below, it will be assumed (unless the contrary is indicated) that the array being formed in any case is a polynucleotide array formed by the in situ method using pulse jet dispensers. However, the applicability of the method to arrays of other polymers or chemical moieties generally, whether formed by multiple cycle in situ methods or deposition of previously obtained moieties, or using other procedures or types of dispensers, will be understood from these discussions.

Figure 4:
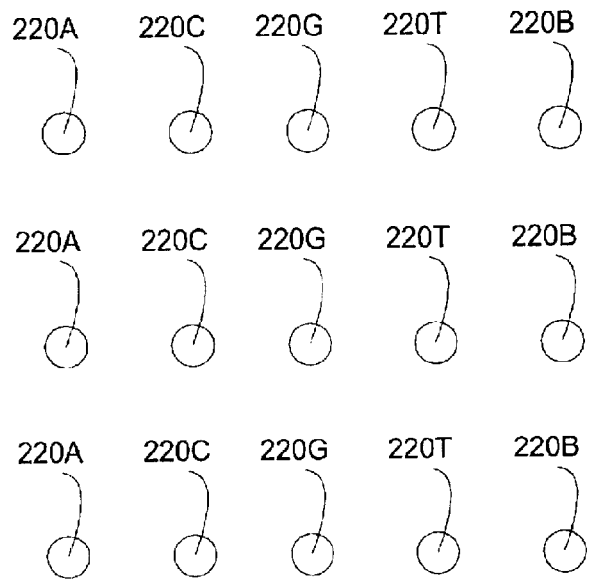
FIG. 4 is a top view of orifices of drop dispensers.

FIGS. 4 and 5 illustrates in part a method of the present invention. Referring to FIG. 4, this is a top view of orifices 220 of drop dispensers in a dispensing head 210 (see below). That is, FIG. 4 is looking from above the head down onto a substrate 10 onto which drops are to be deposited from orifices 220. Each column of three orifices 220A, 220C, 220G, and 220T dispense a corresponding (that is, adenosine, cytidine, guanosine, thymidine, respectively) a drop of a solution containing a nucleoside phosphoramidite which will only become attached to a location at which it is deposited, upon activation by a suitable activator. Suitable activators and related chemistry is described in those references cited above relating to polynucleotide synthesis, as well as in U.S. patent application Ser. No. 09/356,249 titled "Biopolymer Arrays And Their Fabrication" by Perbost, filed Jul. 16, 1999. Another column of three orifices 220B will dispense a solution containing the activator.

FIG. 5 schematically illustrates a deposited drop pattern on substrate 10 over two cycles, for fabrication of the first two nucleotides of the polynucleotides at the multiple locations of features 16a, 16b, 16c to be formed as illustrated in FIG. 3. While only locations of features 16a, 16b, 16c will be discussed for simplicity, it will be understood that drops are deposited during each cycle at further feature locations in an analogous manner. In a first cycle, at each of those locations (and at other feature 16 locations of an array 12) a reagent drop set is deposited to attach a nucleoside monomer, and this procedure repeated at those locations until the polynucleotides illustrated in FIG. 3 are fabricated. A multi-dispenser drop group is deposited at each of the locations 16a, 16b, 16c both with a single cycle and over multiple cycles. Specifically, in a first cycle orifices 220T, 220G, and 220A deposit respective drops 240T, 240G, 240A of phosphoramidite monomer solution at locations 16a, 16b, 16c, respectively on substrate 10 (note in FIG. 5 deposited drops 240 are shown as only somewhat overlapping for clarity, in practice the aim is to have all drops at a feature location overlap each other completely). This is followed, or preceded, by dispensing of a drop 240B of activator solution from an orifice 220B, in the same cycle. As a result, a T, G, A monomer becomes attached to locations 16a, 16b, 16c, respectively. All locations on substrate 10 may then be exposed simultaneously (by flowing across the surface) to reagents for phosphite oxidation, deblocking, and optionally capping, in a known manner. In a second cycle orifices 220G, 220C, 220T deposit a drop 240G, 240C, 240T of corresponding phosphoramidite containing monomer at locations 16a, 16b, 16c, respectively. This is followed, or preceded, by dispensing of a drop of activator solution from an orifice 220B, in the same cycle. Further cycles are performed as required at all feature locations for the array 12 until array 12 is fabricated.

Note that in the foregoing description of FIGS. 4 and 5, a multi-dispenser drop group during a given cycle consists of a drop of one of the phosphoramidites deposited from orifice 220A, 220G, 220T, 220C and a drop of activator from one of the orifices 220B. For example, drops 240A and 240B deposited in a same cycle at location 16a constitute a multi-dispenser drop during one cycle. It will be appreciated that in FIGS. 3 and 4 a multi-dispenser drop group over multiple cycles may include drops from all those different dispensers which deposit drops at a single one of the locations 16a, 16b, 16c. For example, a multi-dispenser drop group over two cycles at location 16a consists of drops 240A, 240B, 240G, 240B. However, dispensers which dispense a multi-dispenser drop group need not necessarily dispense different reagent compositions. For example, it may be desired to dispense multiple same reagent composition drops from respective different dispensers in a same cycle to average any errors occurring from those dispensers. However, in FIGS. 4 and 5 at least one of the drops of different multi-dispenser drop groups are deposited from a same dispenser. For example, over an entire array 12 many of the multi-dispenser drop groups will include at least one drop of a same composition which may be from a same one of the dispensers 220B (although other multi-dispenser drop groups will include a drop from a different one of the dispensers 220B). Furthermore, it will be seen from the foregoing that different multi-dispenser drop groups may have at least one drop deposited by a same dispenser and another drop deposited by a different dispenser. For example, during the first cycle a multi-dispenser drop group for location 16a consists of a drop from a dispenser 220T and a particular one dispenser 220B, while a multi-dispenser drop group for location 16b may consist of a drop from dispenser 220G and the same particular one dispenser 240B. It will be appreciated that multiple drops of a same reagent from a same dispenser can be deposited during any one cycle (instead of just one drop as described above).

Figure 6:
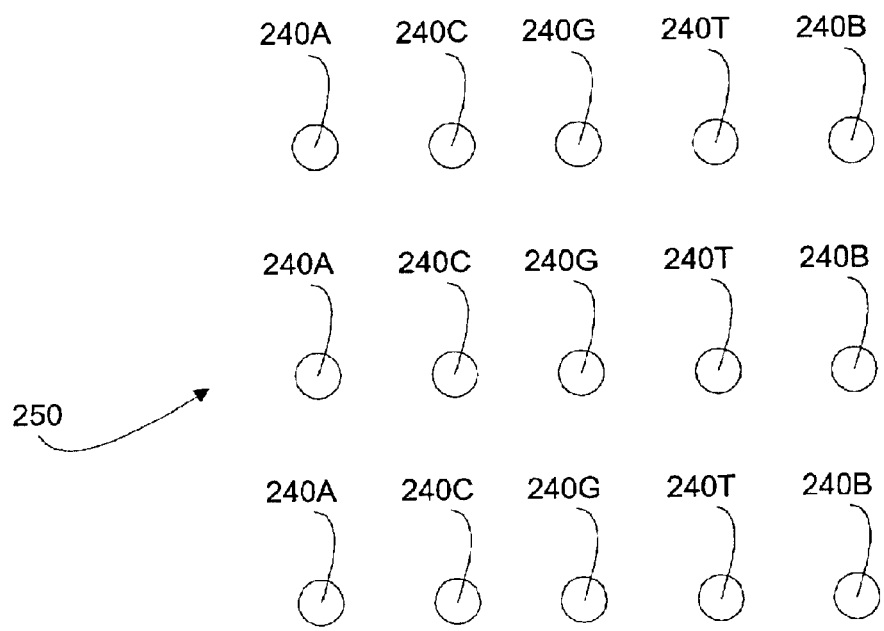
FIG. 6 illustrates a test pattern as formed during a method of the present invention.

In the present invention, drops deposited from different dispensers which deposit a multi-dispenser drop group may be deposited and detected at separate locations on the substrate. For example, the dispenser 220T and the dispenser 220B which deposit the multi-dispenser drop group 240T and 240B during the first cycle at location 16a, are each made to deposit at least one drop at separate different locations on substrate 10. One simple way of doing this is to deposit a single drop from each dispenser of FIG. 5 in a test pattern 250 as illustrated in FIG. 6. The drops deposited in test pattern 250 can be individually detected at their respective test locations in pattern 250, whereas this may not be possible in the feature locations of array 12. For example, drops 240T, 240B of the multi-dispenser drop group deposited by dispensers 220T, 220B during the first cycle at location 16a will both contact each other in the liquid state and will therefore mix. Thus, it is difficult to detect subsequently deposited drop 240B at location 16a in order to check for any error in the dispenser of orifice 220B which deposited that drop. However, it will be easier to check for an error in that dispenser 220B and the dispenser 220T by detecting the drops deposited by them in the separate locations in test pattern 250. Furthermore, the phosphoramidite monomer of any of drops 240A, 240C, 240G, 240T will become attached (either directly to the substrate 10 or to a phosphoramidite monomer attached to that location in the preceding cycle) at the location 16 to which it is deposited, since an activator containing drop 240B is added to each location in each cycle. However, each phosphoramidite containing monomer drop 240A, 240C, 240G, 240T does not become attached at test pattern 250 since an activator containing drop 240B is not deposited at the same locations as those monomer containing drops. Reagents in test pattern 250 deposited during one cycle are therefore washed off during oxidation, deblocking, or capping steps preceding a next cycle, such that the same test pattern 250 area can be readily used again for a next cycle.

Figure 7:
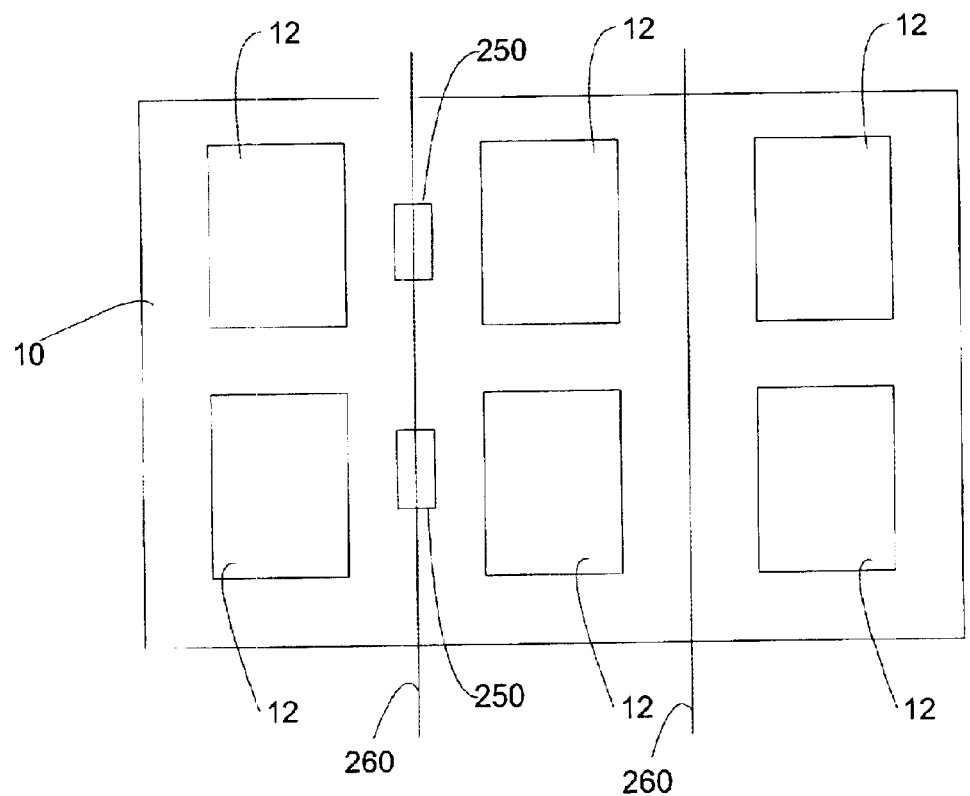
FIG. 7 illustrates multiple arrays and multiple test patterns on a substrate, as may be fabricated and used during methods of the present invention.

Drops deposited at test locations need not be deposited at a separate pattern 250. For example, the test locations could be interspersed between feature locations 16 (that is, in FIG. 2 some of the features 16 could instead be test locations). However, it may be convenient to have a separate test pattern 250. Any test pattern 250 described herein may be variously located. In one arrangement illustrated in FIG. 7, each of multiple test patterns 250 are positioned between two arrays 12. Test patterns 250 in FIG. 7 extend across the same area (represented by a line 260) through which substrate 10 is later cut or otherwise separated to provide multiple portions of the substrate each with one or more fabricated arrays thereon. Substrate 10 can of course be cut along an additional line perpendicular to lines 260 to provide just one array 12 on a substrate portion, if desired.

Figure 8:
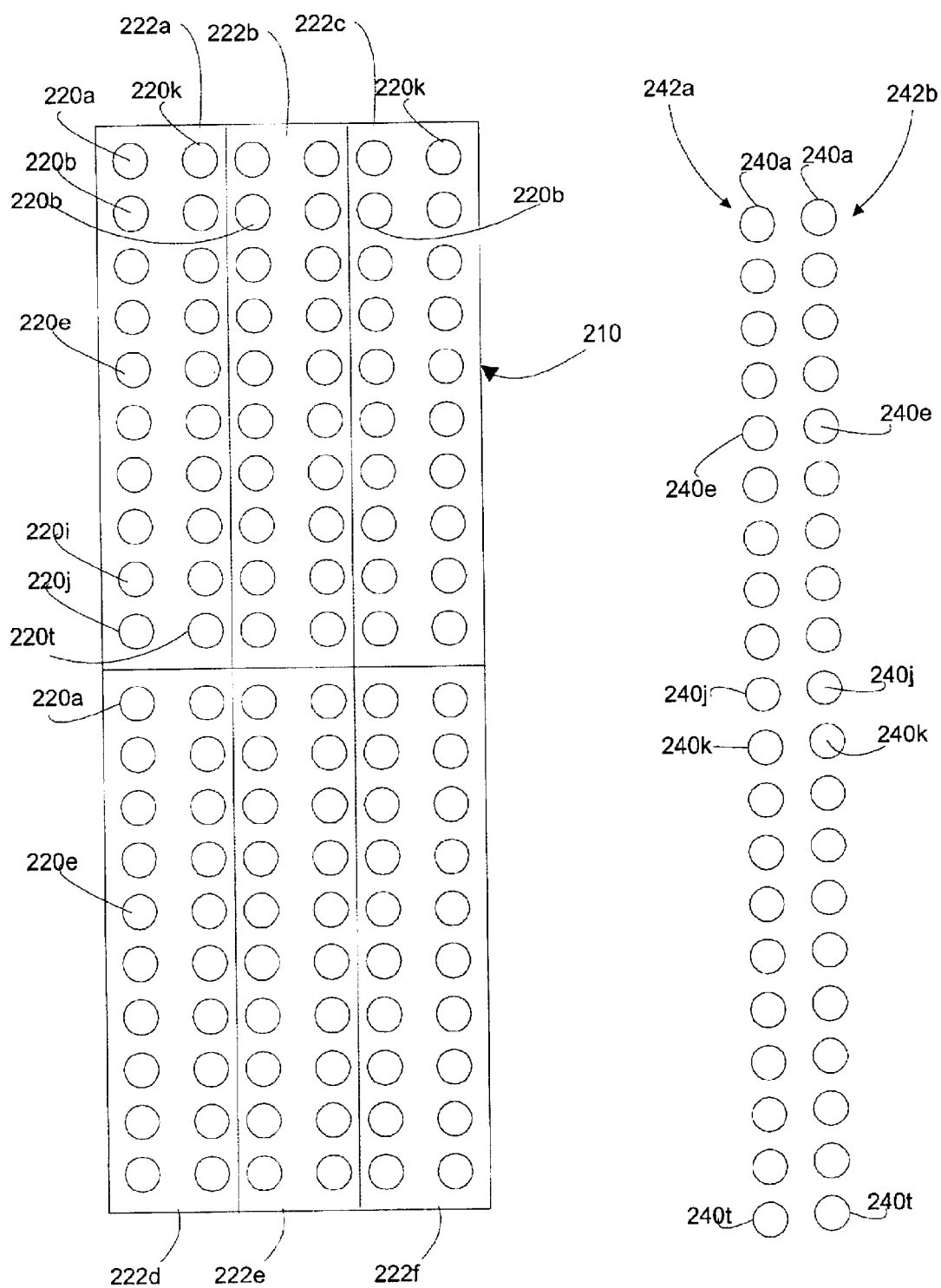
FIG. 8 is a top view of orifices on a particular deposition head and part of a corresponding test pattern which may be deposited according to a method of the present invention.

FIG. 8 illustrates a portion of a particular test pattern. FIG. 8 is looking down from above in the same manner as FIGS. 4–6. In this example, head 210 has a total of six different regions 222a through 222f, each of which has two columns of ten orifices 220a through 220t communicating with a common fluid reservoir (that is, a separate fluid reservoir communicates with a total of twenty orifices 220a through 220t in respective pulse jets). Any four reservoirs (for example, the reservoirs for regions 222a, 222b, 222d, 222e) may contain respective different phosphoramidite monomer solutions with two others (for example, for regions 222c, 222f) containing activator solutions. Head 210 is moved to form a test pattern 250 which has six columns of twenty locations, each column having a deposited drop 240a through 240t deposited from respective orifices 220a through 220t of one head region 222. In FIG. 6 only the two columns 242a and 242b deposited by head regions 222a and 222b, respectively, are shown. It will be understood thought that there will be four more such columns 242 deposited by the four additional regions 222c through 222f. The spacing of the locations 240 in such a test pattern corresponds to that of features 16 in the arrays 12 being formed. The particular test pattern 250 of FIG. 6 not only allows convenient detection of drops from dispensers of a multi-dispenser drop group, but also tests the head positioning software and hardware (due to re-positioning of the two-column format of a region 222 of head 210 into a single column 242 format) and the ability of the dispensers to correctly space dispensed drops at features 16 (since the spacing at test locations 240 is also the same, although it need not be so).

Figure 9:
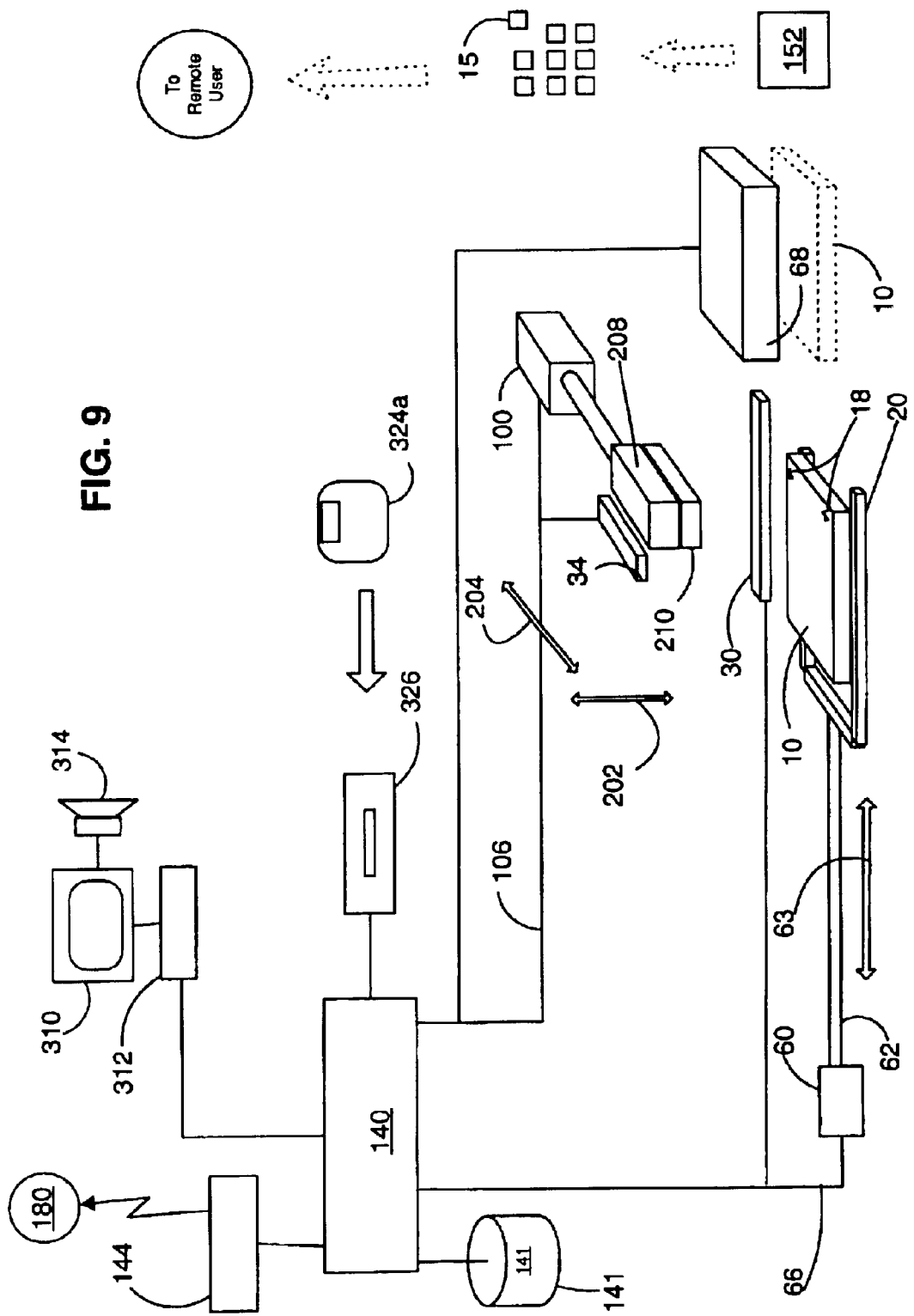
FIG. 9 schematically illustrates an apparatus of the present invention.

Referring now to FIG. 9, an apparatus of the present invention which can execute a method of the present invention, will now be described. The apparatus shown includes a substrate station 20 on which can be mounted a substrate 10. Pins or similar means (not shown) can be provided on substrate station 20 by which to approximately align substrate 10 to a nominal position thereon (with alignment marks 18 on substrate 10 being used for more refined alignment). Substrate station 20 can include a vacuum chuck connected to a suitable vacuum source (not shown) to retain a substrate 14 without exerting too much pressure thereon, since substrate 14 is often made of glass. A flood station 68 is provided which can expose the entire surface of substrate 10, when positioned beneath station 68 as illustrated in broken lines in FIG. 4, to a fluid typically used in the in situ process, and to which all features must be exposed during each cycle (for example, oxidizer, deprotection agent, and wash buffer). In the case of deposition of a previously obtained polynucleotide, flood station 68 need not be present.

A dispensing head 210 is retained by a head retainer 208. The positioning system includes a carriage 62 connected to a first transporter 60 controlled by processor 140 through line 66, and a second transporter 100 controlled by processor 140 through line 106. Transporter 60 and carriage 62 are used execute one axis positioning of station 20 (and hence mounted substrate 10) facing the dispensing head 210, by moving it in the direction of arrow 63, while transporter 100 is used to provide adjustment of the position of head retainer 208 (and hence head 210) in a direction of axis 204. In this manner, head 210 can be scanned line by line, by scanning along a line over substrate 10 in the direction of axis 204 using transporter 100, while line by line movement of substrate 10 in a direction of axis 63 is provided by transporter 60. Transporter 60 can also move substrate holder 20 to position substrate 10 beneath flood station 68 (as illustrated by the substrate 10 shown in broken lines in FIG. 4). Head 210 may also optionally be moved in a vertical direction 202, by another suitable transporter (not shown). It will be appreciated that other scanning configurations could be used. It will also be appreciated that both transporters 60 and 100, or either one of them, with suitable construction, could be used to perform the foregoing scanning of head 210 with respect to substrate 10. Thus, when the present application recites "positioning" or "moving" one element (such as head 210) in relation to another element (such as one of the stations 20 or substrate 10) it will be understood that any required moving can be accomplished by moving either element or a combination of both of them. The head 210, the positioning system, and processor 140 together act as the deposition system of the apparatus. An encoder 30 communicates with processor 140 to provide data on the exact location of substrate station 20 (and hence substrate 10 if positioned correctly on substrate station 20), while encoder 34 provides data on the exact location of holder 208 (and hence head 210 if positioned correctly on holder 208). Any suitable encoder, such as an optical encoder, may be used which provides data on linear position.

Processor 140 also has access through a communication module 144 to a communication channel 180 to communicate with a remote station. Communication channel 180 may, for example, be a Wide Area Network ("WAN"), telephone network, satellite network, or any other suitable communication channel.

Head 210 may be of a type commonly used in an ink jet type of printer and may, for example, include five or more chambers (at least one for each of four nucleoside phosphoramidite monomers plus at least one for an activator solution) each communicating with a corresponding set of multiple drop dispensing orifices and multiple ejectors which are positioned in the chambers opposite respective orifices. Each ejector is in the form of an electrical resistor operating as a heating element under control of processor 140 (although piezoelectric elements could be used instead). Each orifice with its associated ejector and portion of the chamber, defines a corresponding pulse jet. It will be appreciated that head 210 could, for example, have more or less pulse jets as desired (for example, at least ten or at least one hundred pulse jets). Application of a single electric pulse to an ejector will cause a droplet to be dispensed from a corresponding orifice. Certain elements of the head 210 can be adapted from parts of a commercially available thermal inkjet print head device available from Hewlett-Packard Co. as part no. HP51645A. Alternatively, multiple heads could be used instead of a single head 210, each being similar in construction to head 210 and being provided with respective transporters under control of processor 140 for independent movement. In this alternate configuration, each head may dispense a corresponding biomonomer (for example, one of four nucleoside phosphoramidites) or an activator solution.

As is well known in the ink jet print art, the amount of fluid that is expelled in a single activation event of a pulse jet, can be controlled by changing one or more of a number of parameters, including the orifice diameter, the orifice length (thickness of the orifice member at the orifice), the size of the deposition chamber, and the size of the heating element, among others. The amount of fluid that is expelled during a single activation event is generally in the range about 0.1 to 1000 pL, usually about 0.5 to 500 pL and more usually about 1.0 to 250 pL. A typical velocity at which the fluid is expelled from the chamber is more than about 1 m/s, usually more than about 10 m/s, and may be as great as about 20 m/s or greater. As will be appreciated, if the orifice is in motion with respect to the receiving surface at the time an ejector is activated, the actual site of deposition of the material will not be the location that is at the moment of activation in a line-of-sight relation to the orifice, but will be a location that is predictable for the given distances and velocities.

The apparatus can deposit droplets to provide features which may have widths (that is, diameter, for a round spot) in the range from a minimum of about 10 $\mu$m to a maximum of about 1.0 cm. In embodiments where very small spot sizes or feature sizes are desired, material can be deposited according to the invention in small spots whose width is in the range about 1.0 $\mu$m to 1.0 mm, usually about 5.0 $\mu$m to 500 $\mu$m, and more usually about 10 $\mu$m to 200 $\mu$m.

The apparatus further includes a display 310, speaker 314, and operator input device 312. Operator input device 312 may, for example, be a keyboard, mouse, or the like.

Processor 140 has access to a memory 141, and controls print head 210 (specifically, the activation of the ejectors therein), operation of the positioning system, operation of each jet in print head 210, and operation of display 310 and speaker 314. Memory 141 may be any suitable device in which processor 140 can store and retrieve data, such as magnetic, optical, or solid state storage devices (including magnetic or optical disks or tape or RAM, or any other suitable device, either fixed or portable). Processor 140 may include a general purpose digital microprocessor suitably programmed from a computer readable medium carrying necessary program code, to execute all of the steps required by the present invention, or any hardware or software combination which will perform those or equivalent steps. The programming can be provided remotely to processor 140 through communication channel 180, or previously saved in a computer program product such as memory 141 or some other portable or fixed computer readable storage medium using any of those devices mentioned below in connection with memory 141. For example, a magnetic or optical disk 324a may carry the programming, and can be read by disk writer/reader 326. A cutter 152 is provided to cut substrate 10 into individual array units 15 each carrying a corresponding array 12.

The operation of the fabrication station will now be described. It will be assumed that a substrate 10 on which arrays 12 are to be fabricated, is in position on station 20 and that processor 140 is programmed with the necessary layout information to fabricate target arrays 12. Using information such as the foregoing target layout and the number and location of drop dispensers in head 210, processor 140 can then determine a reagent drop deposition pattern. Alternatively, such a pattern could have been determined by another processor (such as a remote processor) and communicated to memory 141 through communication channel 180 or by forwarding a portable storage medium carrying such pattern data for reading by reader/writer 326. Processor 140 controls fabrication, in accordance with the deposition pattern, to generate the one or more arrays 12 on substrate 10 by depositing for each target feature during each cycle, a reagent drop set as previously described. Processor 140 also sends substrate 10 to flood station 68 for cycle intervening or final steps as required, all in accordance with the conventional in situ polynucleotide array fabrication process described above. The substrate 10 is then sent to a cutter 152 wherein portions of substrate 10 carrying one ore more arrays 12 are separated from the remainder of substrate 10, to provide multiple array units 15 each with one or more arrays 12. One or more array units 15 may then be forwarded to one or more remote users. Processor 140 also causes deposition of drops from all multi-dispenser drop groups to be deposited at separate test locations, such as at a test pattern 250 which may be separate from arrays 12 as already described above.

Deposited drops at any test location can be detected by capturing an image of the drops such as described in U.S. patent applications: "Polynucleotide Array Fabrication" by Caren et al., Ser. No. 09/302,898 filed Apr. 30, 1999; and "Biopolymer Array Inspection", Ser. No. 09/419,447, filed Oct. 15, 1999 by Fisher. Alternatively, drops can be detected by using the method described in U.S. patent application "Array Fabrication With Drop Detection", Ser. No. 09/558, 532, filed Apr. 26, 2000 by Schantz et al. When an error is sensed in a dispenser, fabrication can be halted and an attempt made to correct the error (for example, by cleaning or replacing the dispenser in error). As well, one or more arrays 12 which will likely contain an error in one or more features 16 as a result of the detected dispenser error, can be discarded or further drops can be deposited from one or more dispensers from the same or a replacement head 210 in an attempt to correct the array errors. Alternatively, or additionally, results from the detection (whether raw or processed in some way) or any such identified errors in the array, can be saved in a local memory at a fabrication station in association with a file and an assigned identifier, and the identifier associated with the array and forwarded to a remote end user station, in any of those manners as described in U.S. patent application Ser. No. 09/302,898 mentioned above. For example, the identifier may be applied to the array substrate 10 or a housing carrying it, and array and associated identifier forwarded to the remote user station. In a variation, the results or identified errors can be saved on a portable storage medium which is shipped to the end user, typically in association with the array (for example, in the same package), as further described in the foregoing application.

The results from the detection may be used alternatively or additionally in a number of ways. In one way, the results from the detecting may be evaluated based at least in part on a cycle during which the results were obtained. Depending upon the particular chemistry used in the fabrication process, errors in the location of drop depositions may be given greater weight as a function of the cycle during which they occur. For example, for the polynucleotide in situ fabrication using phosphoramidite chemistry, errors in drop location during later cycles may be assigned less weight than an error of the same magnitude in an earlier cycle (such as in the first cycle). Also, a parameter (such as location or size) of the dispensing of the drops to fabricate the array, may be adjusted before or during array fabrication (or after array fabrication with the results being used for fabricating a subsequent array) based at least in part on the results of the detecting. For example, dispensers or their positioning may be calibrated based on such results. In another application, for the drops detected replicates of a same drop from a same dispenser may be deposited at multiple different locations on the substrate. In this case, a characteristic of the substrate may be evaluated based on the results of detecting the replicates. For example, if the dispensers are known to function to deposit drops reproducibly, then if detected deposited drops have a different size on the substrate, this would indicate the substrate surface does not have homogeneous properties. Such a substrate quality assessment may be performed before, during, or after array fabrication. In a further application, dispenser performance may be evaluated based on relative characteristics of drops of different composition deposited from different dispensers. For example, the activator tetrazole has a viscosity (typically approximately 4 cp) which is much less than a phosphoramidite viscosity (about 7 cp) and thus a deposited tetrazole drop tends to have a larger diameter on the substrate than a deposited drop of the same volume of phosphoramidite. Where the detecting includes a measurement of the size of the area covered by a deposited drop, the results from detecting could be used to evaluate for errors (such as load or prime errors). Note that other components could be included in the reagents to further distinguish one from the other.

The above array fabrication sequence can be repeated at the fabrication station as desired for multiple substrates 10 in turn. As mentioned above, the fabrication station may act as a central fabrication station for each of multiple remote user stations, in the same manner as described above. When a user receives an array unit 15, it will typically be exposed to a sample and the array read following exposure. Array reading is usually accomplished by a suitable scanner which can read the location and intensity of fluorescence at each feature of an array following exposure to a fluorescently labeled sample. For example, such a scanner may be similar to the GENEARRAY scanner available from Hewlett-Packard, Palo Alto, Calif. At the user station the any array layout information can be retrieved for an array 12 over a communication channel (or alternatively from a local memory) from the now remote memory at the fabrication station, in response to communicating the identifier for that array. This retrieved information can be used in the reading or processing of read results from the array. The foregoing methods are described in more detail in the previously mentioned Ser. No. 09/302,898. Results from reading can be processed such as by rejecting a reading for a feature which is below a predetermined threshold and/or forming conclusions based on the pattern read from the array (such as whether or not a particular target sequence may have been present in the sample). The results of the interrogation or processing can be communicated for receipt at a remote location if desired, for further use.

In a variation of the above, it is possible that each unit 15 may be contained with a suitable housing. Such a housing may include a closed chamber accessible through one or more ports normally closed by septa, which carries the substrate 10.

Modifications in the particular embodiments described above are, of course, possible. For example, where a pattern of arrays is desired, any of a variety of geometries may be constructed other than the organized rows and columns of arrays 12 of FIG. 1. For example, arrays 12 can be arranged in a series of curvilinear rows across the substrate surface (for example, a series of concentric circles or semi-circles of spots), and the like. Similarly, as mentioned, the pattern of features 16 may be varied from the organized rows and columns of spots in FIG. 2 to include, for example, a series of curvilinear rows across the substrate surface(for example, a series of concentric circles or semi-circles of spots), and the like.

The present methods and apparatus may be used to deposit biopolymers or other moieties on surfaces of any of a variety of different substrates, including both flexible and rigid substrates. Preferred materials provide physical support for the deposited material and endure the conditions of the deposition process and of any subsequent treatment or handling or processing that may be encountered in the use of the particular array. The array substrate may take any of a variety of configurations ranging from simple to complex. Thus, the substrate could have generally planar form, as for example a slide or plate configuration, such as a rectangular or square or disc. In many embodiments, the substrate will be shaped generally as a rectangular solid, having a length in the range about 4 mm to 200 mm, usually about 4 mm to 150 mm, more usually about 4 mm to 125 mm; a width in the range about 4 mm to 200 mm, usually about 4 mm to 120 mm and more usually about 4 mm to 80 mm; and a thickness in the range about 0.01 mm to 5.0 mm, usually from about 0.1 mm to 2 mm and more usually from about 0.2 to 1 mm. However, larger substrates can be used, particularly when such are cut after fabrication into smaller size substrates carrying a smaller total number of arrays 12. Substrates of other configurations and equivalent areas can be chosen. The configuration of the array may be selected according to manufacturing, handling, and use considerations.

The substrates may be fabricated from any of a variety of materials. In certain embodiments, such as for example where production of binding pair arrays for use in research and related applications is desired, the materials from which the substrate may be fabricated should ideally exhibit a low level of non-specific binding during hybridization events. In many situations, it may also be preferable to employ a material that is transparent to visible and/or UV light. For flexible substrates, materials of interest include: nylon, both modified and unmodified, nitrocellulose, polypropylene, and the like, where a nylon membrane, as well as derivatives thereof, may be particularly useful in this embodiment. For rigid substrates, specific materials of interest include: glass; fused silica, silicon, plastics (for example, polytetrafluoroethylene, polypropylene, polystyrene, polycarbonate, and blends thereof, and the like); metals (for example, gold, platinum, and the like).

The substrate surface onto which the polynucleotide compositions or other moieties is deposited may be porous or non-porous, smooth or substantially planar, or have irregularities, such as depressions or elevations. The surface may be modified with one or more different layers of compounds that serve to modify the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include: inorganic and organic layers such as metals, metal oxides, polymers, small organic molecules and the like. Polymeric layers of interest include layers of: peptides, proteins, polynucleic acids or mimetics thereof (for example, peptide nucleic acids and the like); polysaccharides, phospholipids, polyurethanes, polyesters, polycarbonates, polyureas, polyamides, polyethyleneamines, polyarylene sulfides, polysiloxanes, polyimides, polyacetates, and the like, where the polymers may be hetero- or homopolymeric, and may or may not have separate functional moieties attached thereto (for example, conjugated).

Various further modifications to the particular embodiments described above are, of course, possible. Accordingly, the present invention is not limited to the particular embodiments described in detail above.

What is claimed is:

1. A method of forming an addressable array of chemical moieties on a substrate, comprising:
   (a) providing a substrate having multiple feature locations and multiple test locations;
   (b) depositing a reagent drop set from a single dispenser onto each feature location so as to attach a corresponding moiety for each feature location, wherein said deposition of a reagent drop set is a cycle;
   (c) repeating step (b) at each feature location until the addressable array is formed;
   wherein for each feature location of said addressable array a multi-dispenser drop group is deposited thereon, wherein said multi-dispenser drop group is formed over two or more cycles of (b) and (c); and wherein said drops deposited in said two or more cycles are deposited from at least two or more different dispensers;
   the method additionally comprising:
   (d) depositing individual reagent drops of a previously formed multi-dispenser drop group from said different dispensers at respective, separate test locations on the substrate; wherein each of said separate test locations does not include a previously deposited drop; and
   (e) detecting said individual reagent drops at said respective test locations.

2. The method according to claim 1 wherein drops of the multi-dispenser drop group in step (d) are not independently detected at the corresponding feature location in step (b).

3. The method according to claim 1 wherein a multi-dispenser drop group comprises a drop including an attachment moiety which becomes attached at the feature location at which the drop is deposited in step (b) or (c) but which does not become attached at a test location in step (d).

4. The method according to claim 1 wherein a multi-dispenser drop group comprises a drop including an attachment moiety which will become attached at the feature location at which the drop is deposited upon activation by an activator moiety, and at least one other drop comprises the activator moiety, such that the attachment moiety and activator moiety are deposited at separate test locations in step (d).

5. The method according to claim 1 wherein in (d) drops are deposited and in (e) detected at respective separate test locations on the substrate from all those dispensers which deposit a multi-dispenser drop group.

6. The method according to claim 2 wherein in step (e) the drops are detected on the separate test locations on the substrate.

7. The method according to claim 1, wherein step (e) additionally comprises capturing an image of drops deposited during step (d).

8. The method according to claim 6 additionally comprising evaluating results from the detecting for an indication of a dispenser error and, when an error is detected, discarding the array or depositing further drops to correct the error.

9. The method according to claim 6 additionally comprising saving results from the detecting in a memory.

10. The method according to claim 6 additionally comprising evaluating results from the detecting based at least in part on at least one multi-dispenser group for which the results were obtained.

11. The method according to claim 10 wherein results from detecting multiple dispenser groups are obtained and the evaluation is based at least in part on the dispenser groups for which the results were obtained.

12. The method according to claim 2, wherein steps (d) and (e) are performed between two cycles and afterwards adjusting a parameter of the dispensing in step (b) or (c) based at least in part on the results from step (e).

13. The method according to claim 1 wherein in step (d) replicates of a same drop from a same dispenser are deposited at multiple different test locations on the substrate, the method additionally comprising evaluating a characteristic of the substrate based on the results of detecting the replicates.

14. The method according to claim 1 additionally comprising evaluating dispenser performance based on relative characteristics of drops of different composition deposited from different dispensers.

15. The method according to claim 1 wherein during step (b) or (c) drops of multi-dispenser drop groups are deposited at respective substrate locations such that one drop of the group contacts a previously deposited drop of the same group at the same feature location.

16. The method according to claim 2 wherein different multi-dispenser drop groups each have at least one drop deposited by a same dispenser and another drop deposited by a different dispenser.

17. The method according to claim 2 wherein the at least some of the drops of a multi-dispenser drop group are of a different composition.

18. The method according to claim 2 wherein at least one of the drops of different multi-dispenser drop groups are deposited from a same dispenser.

19. A method according to claim 1 wherein different multi-dispenser drop groups are deposited at respective substrate feature locations in step (b) or (c), and wherein the drops deposited in step (d) and detected in step (e) are deposited in a test pattern area of said substrate separate from the array.

20. A method of forming an addressable array of chemical moieties on a substrate, comprising:
  (a) providing a substrate having multiple feature locations and multiple test locations, where said multiple test locations are present in a test pattern area separate from the multiple feature locations;
  (b) depositing a reagent drop set from a single dispenser onto each feature location so as to attach a corresponding moiety for each feature location, wherein said deposition of a reagent drop set is a cycle;
  (c) repeating step (b) at each feature location until the addressable array is formed;
  wherein for each feature location of said addressable array a multi-dispenser drop group is deposited thereon, wherein said multi-dispenser drop group is formed over two or more cycles of (b) and (c); and wherein said drops deposited in said two or more cycles are deposited from at least two or more different dispensers;
  the method additionally comprising:
  (d) depositing individual reagent drops of a previously formed multi-dispenser drop group from said different dispensers at respective, separate test locations on the substrate; wherein each of said separate test locations does not include a previously deposited drop; and
  (e) detecting said individual reagent drops at said respective test locations.

21. The method according to claim 20 wherein a multi-dispenser drop group comprises a drop including an attachment moiety which becomes attached at the feature location at which the drop is deposited in step (b) or (c) but which does not become attached at a test location in step (d).

22. The method according to claim 20 wherein a multi-dispenser drop group comprises a drop containing an attachment moiety which will become attached at that feature location upon activation by an activator moiety, and at least one other drop containing the activator moiety, such that the attachment moiety and activator moiety are deposited at separate test locations in step (d).

23. The method according to claim 22 wherein in step (d) no activator containing drop is deposited at a same test location as an attachment moiety containing drop.

24. The method according to claim 22 wherein different multi-dispenser drop groups are deposited at respective substrate feature locations in step (b) or (c), and wherein drops from dispensers which deposit different multi-dispenser drop groups are deposited and detected, respectively in steps (d) and (e) in a test pattern area separate from the array.

25. A method of forming an addressable array of polymers on a substrate, comprising:
  (a) providing a substrate having multiple feature locations and multiple test locations;
  (b) depositing a reagent drop set from a single dispenser onto each feature location so as to attach a monomeric unit of the corresponding polymer for each feature location, wherein said deposition of a reagent drop set is a cycle;
  (c) repeating step (b) at each feature location until the addressable array is formed;

wherein for each feature location of said addressable array a multi-dispenser drop group is deposited thereon, wherein said multi-dispenser drop group is formed over two or more cycles of (b) and (c); and wherein said drops deposited in said two or more cycles are deposited from at least two or more different dispensers;

the method additionally comprising:

(d) depositing individual reagent drops of a previously formed multi-dispenser drop group from said different dispensers at respective, separate test locations on the substrate; wherein each of said separate test locations does not include a previously deposited drop; and (e) detecting said individual reagent drops at said respective test locations.

26. The method according to claim 25 wherein a multi-dispenser drop group comprises a drop including an attachment moiety which becomes attached at the feature location at which the drop is deposited in step (b) or (c) but which does not become attached at a test location in step (d).

27. The method according to claim 25 wherein the polymers are biopolymers.

28. The method according to claim 27 wherein a multi-dispenser drop group deposited during a cycle comprises a drop including the monomeric unit which will become attached at that feature location upon activation by an activator moiety, and at least one other drop comprises the activator moiety, such that the monomeric unit and activator moiety are deposited at separate test locations in step (d).

29. The method according to claim 25 wherein steps (d) and (e) are performed between two cycles.

30. The method according to claim 25 wherein steps (d) and (e) are performed between two cycles, and performed again between another two cycles.

31. The method according to claim 25 wherein drops are deposited and detected at respective separate test locations on the substrate from all those dispensers which deposit a multi-dispenser drop group.

32. The method according to claim 25 wherein in step (e) the drops are detected on the substrate.

33. The method according to claim 25, wherein step (e) additionally comprises capturing an image of drops deposited during step (d).

34. The method according to claim 28 wherein step (d) and e are performed between two cycles, the method additionally comprising when an error in a monomeric unit or activator drop dispenser is detected then depositing further drops containing the monomeric unit or activator moiety so as to correct the error.

35. The method according to claim 26 wherein during step (b) or (c) drops of multi-dispenser drop groups are deposited at respective substrate feature locations such that one drop of the group contacts a previously deposited drop of the same group at the same feature location.

36. The method according to claim 28 wherein the activator containing drop for multiple feature locations is deposited from a same dispenser.

37. The method according to claim 25 wherein different multi-dispenser drop groups are deposited at respective substrate feature locations in step (b) or (c), and wherein the drops deposited in step (d) and detected in step (e) are deposited in a test pattern area separate from the array.

38. A method of forming multiple addressable arrays of chemical moieties on a substrate, comprising for each array:

(a) providing a substrate having multiple feature locations and multiple test locations;

(b) depositing a reagent drop set from a single dispenser onto each feature location so as to attach a monomeric unit of the corresponding polymer for each feature location, wherein said deposition of a reagent drop set is a cycle;

(c) repeating step (b) at each feature location until the addressable array is formed;

wherein for each feature location of said addressable array a multi-dispenser drop group is deposited thereon, wherein said multi-dispenser drop group is formed over two or more cycles of (b) and (c); and wherein said drops deposited in said two or more cycles are deposited from at least two or more different dispensers;

the method additionally comprising:

(d) depositing individual reagent drops of a previously formed multi-dispenser drop group from said different dispensers at respective, separate test locations on the substrate; wherein each of said separate test locations does not include a previously deposited drop and wherein the drops are deposited at a separate test pattern area between arrays with the number of test locations of the test pattern area being less than one tenth the number of feature locations in the smallest of the arrays which the test pattern area is between; and (e) detecting said individual reagent drops at said respective test locations.

39. The method according to claim 38 wherein the number of test locations of the test pattern area is not greater than ten times the number of the dispensers used to form an array.

* * * * *